Oct. 17, 1950         E. F. WALLENDORF         2,526,522
RANGE FINDER ARRANGEMENT FOR CAMERAS
Original Filed Oct. 22, 1940         2 Sheets-Sheet 1
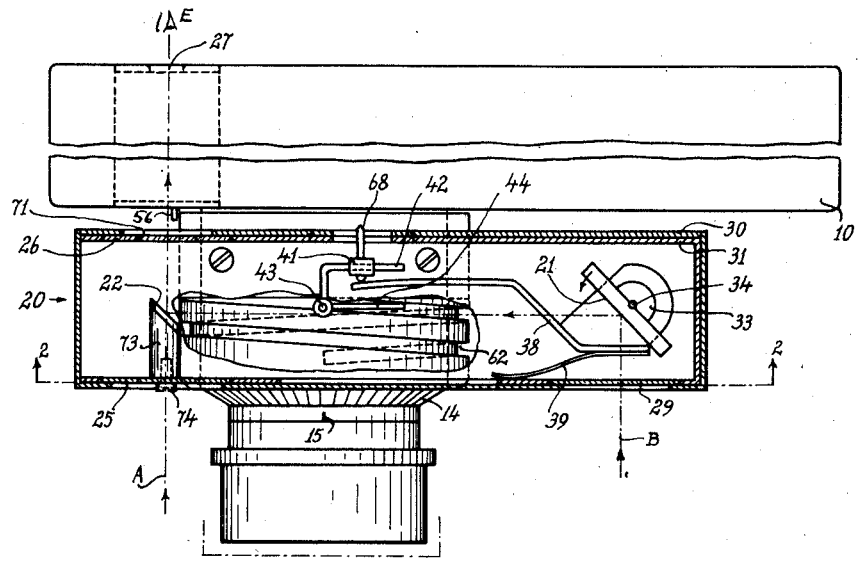
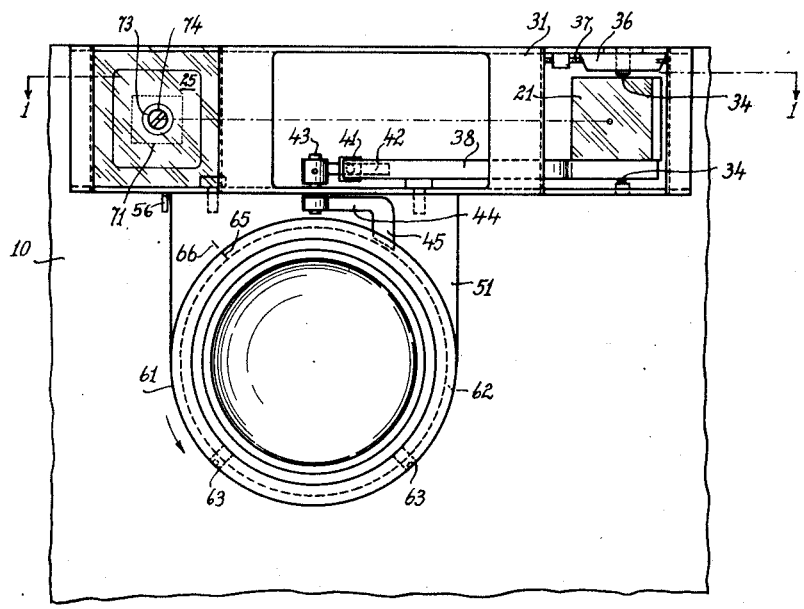
INVENTOR
Edward F. Wallendorf.
BY
ATTORNEY.

Oct. 17, 1950  E. F. WALLENDORF  2,526,522
RANGE FINDER ARRANGEMENT FOR CAMERAS
Original Filed Oct. 22, 1940  2 Sheets-Sheet 2

INVENTOR
Edward F. Wallendorf.
BY S. Michael Pruples
ATTORNEY

Patented Oct. 17, 1950

2,526,522

UNITED STATES PATENT OFFICE 2,526,522

RANGE FINDER ARRANGEMENT FOR CAMERAS

Edward F. Wallendorf, Lynbrook, N. Y., assignor to The Kalart Company Inc., Stamford, Conn.

Substituted for abandoned application Serial No. 362,184, October 22, 1940. This application April 19, 1946, Serial No. 663,385

2 Claims. (Cl. 95—44)

This invention relates to photographic cameras provided with range finders of the general type in which the focusing of the camera is affected simultaneously with the adjustment of the range finder so that the object that is to be photographed is properly focused, for instance, in the focal plane of the camera.

Among the objects of the invention is a range finder of the base type which is so combined with an objective of a camera that it may be removed with the associated lens structure as a unit from the camera and exchangeably mounted in its operative position on the camera without disturbing the cooperative relation between the lens structure and the range finder of the invention.

The present application is a substitute for my abandoned application Ser. No. 362,184 filed October 22, 1940.

The foregoing and other objects of the invention will be best understood from the following description of exemplifications thereof, reference being had to the accompanying drawings wherein Fig. 1 is a top view of a camera equipped with one form of range finder arrangement of the invention, parts of the range finder being shown in section;

Fig. 2 is a front view of a camera equipped with the range finder of Fig. 1.

There are many cameras having exchangeable lens equipment to permit the exchange of one lens equipment for another, depending on the nature of the distance of the object that is to be photographed. If such camera is equipped with an optical range finder, which is coupled in the conventional way to the lens equipment so that the adjustment of the range finder automatically focuses the lens equipment, difficulties are encountered if one lens equipment is substituted for another, because a range finder correlated to cooperate properly with a given lens equipment, will not operate correctly with a different lens equipment.

Accordingly to one phase of the invention, these difficulties are overcome by so combining each exchangeable lens equipment with a range finder that when the lens is removed from the camera, the associated range finder is automatically removed as a unit with the lens equipment, and that whenever the lens equipment of a camera is exchanged, the associated range finder will assure automatic proper focusing with the exchanged lens equipment.

Figure 3:
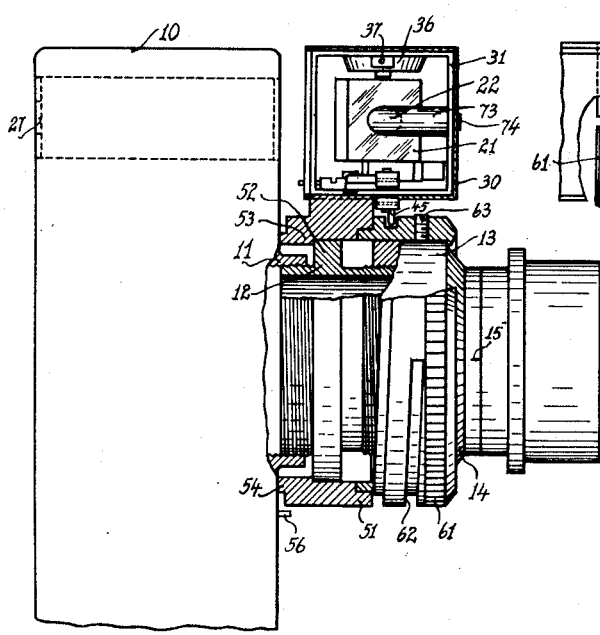
Fig. 3 is a side view of the arrangement of Fig. 1 with parts of the range finder shown in section.

As shown in Figs. 1 to 3 of the drawings, a camera having a housing 10 of the conventional type, has on its lens mounting wall an internally threaded lens opening 11 for holding in its proper position an exchangeable lens structure 12 arranged in the usual way to permit its ready removal and exchange by another lens structure having a different optical system. The lens structure 12 is of the conventional type and has the usual array of lenses, which are adjusted, for focusing the picture of the object in the focal plane of the camera, by turning a lens focusing collar member 13 on the threaded surface of the lens structure 12 so that it moves axially one of the lenses, a scale 14 on the outer tapered surface of the collar 13 indicating on a mark 15 provided on the exterior of the lens structure the different lens adjustments.

The lens structure is combined with a base-type ranger finder 20 which is secured to the lens structure and is removable as a unit with the lens structure.

Any suitable type of range finder designs, such as those described in U. S. Patents 2,113,307, 2,117,428, 2,127,925 or 2,172,339 may be used for the range finder arrangement of the invention. The ranger finder is designed to receive a direct beam of light A and a deflected beam of light B, which traverses the base line of the finder, the two ends of which are determined by two light deflecting elements 21, 22.

Although any of the known light deflecting means may be used in the form of range finder shown, the two light deflecting elements 21, 22 are formed by deflecting mirrors, and one of the two mirrors, namely mirror 21, is tiltably mounted so as to serve as the light deviating means which enables controlled tilting of the reflected light beam B relatively to the direct beam A.

The range finder may be provided with the usual image-forming lens elements, of the type described in the above identified prior patents, for instance, but in the arrangement shown, it is equipped merely with a simple telescope formed by two rectangular transparent plates 25, 26 of glass, and an ocular lens 27, defining a viewing passage having an optical axis in the direction of the direct beam A toward the eye of the observer. In the form shown, the ocular lens 27 is mounted in the rear position of the viewing passage formed in the camera housing, and aligned with the portion of the viewing passage formed by the range finder housing. A similar transparent plate 29 of glass, is placed in front of the tilting deflecting mirror 21. As in conventional range finders of the same general type, the several elements are so adjusted that when the eye E viewing a given object, sees the two images conveyed to it by the two light beams A and B in fully registered coinciding positions, so that only one image is visible to the eye, the angular position of the tilting mirror to the axis of the beam B corresponds to, or is a measure of, the distance of the object viewed.

The two mirrors 21, 22 and the associated glass plates 25, 26, 27 are mounted in their operative positions on a frame structure 31 of a housing 30 bounding the optical passage and enclosing the mechanical elements of the range finder 20. The tilting mirror 21 is secured to a mount member 33 which has two pivot pins 34, the lower pivot pin 34 being seated in a hole of the underlying frame wall, and the upper pivot pin 34 being seated in a bearing surface of a threaded bearing stud held in a centering plate 36 having a conical rim and adjustably held against its supporting frame wall by the engagement of its conical rim with the tapered ends of three centering studs 37 threadedly held by adjacent portions of the frame structure 31.

In the arrangement shown, the light deviating means for bringing the reflected beam of light into registration with the direct beam of light are formed by cam arm 38, extending from the lower end of the tiltable mirror mount 33 and biased by a spring 39 so as to maintain its cam surface portion in engagement with a follower 41 held by an arm 42 affixed to the inner end of a pivot pin 43 journaled in the lower wall of the range-finder frame structure 31 and carrying at its lower end a control arm 44 which is coupled to the lens equipment so that the axial motion imparted to the focusing collar 13 when it is turned relatively to the other parts of the lens structure, imparts a corresponding tilting motion to the control arm 44 which in turn imparts through the follower arm and follower 41 a predetermined tilting motion to the cam arm 38 and the tilting mirror 21, so as to enable accurate focusing of the lens in relation to a given observed scene, when the images of the scene conveyed by the direct beam A and the deflected beam B are in registration. The range finder 20 is designed and arranged for mounting on the lens structure 12 so that when the lens structure is removed from the camera, the entire range finder is removed with it.

In the form shown in Figs. 1 to 3, the range finder housing structure 30 is provided with a downwardly extending collar extension 51 fitting over the cylindrical rear portion 52 of the lens housing structure 12 and arranged to be fixedly held in its required operating position when the lens structure is mounted in its operating position on the camera. To this end, the rear portion of the collar 51 may be provided with a flange 53 which is engaged by the shoulder formed by the cylindrical flange 52 of the lens structure 12 bordering its threaded rear portion, so that when the lens structure 12 is mounted in its proper operating position, a rearwardly projecting portion 54 of the collar 51 is clamped against the facing front wall of the camera.

A suitable aligning mark or aligning member, such as indicated at 56, is provided on the front wall of the camera so as to align the range finder in its proper operating position. In order to couple the lens focusing collar 13 to the light deviating mirror 21, the focusing collar 13 is provided with a cam member 61 having a cam surface 62 shaped so that when the focusing collar 13 is rotated, to move it axially relatively to the lens structure 12, it actuates the control arm 44 of the range finder so as to produce a light ray deviation corresponding to each focusing position of the focusing collar 13 of the lens structure, so that the images of the range finder are brought into coincidence in strict accoradnce with the distance for which the camera is focused.

In the form shown, the cam surface 62 is formed by a helical groove formed in the cam member 61 which is shown in the form of a collar threadedly attached by a plurality of screw studs 63 to the cylindrical outer surface of the focusing collar 13.

The control arm 44 has a downwardly projecting follower portion 45 shaped to engage the cam surface 62 formed on the lens focusing collar 13. The cam collar 61 may be provided with a registering mark 65 so that after the lens structure 12 with the range finder structure 30 is mounted in place on the camera, the cam collar member 61 is placed in its position on the lens, and after bringing the inner end of its helical groove 62 into engagement with the cam follower pin 45 of the range finder control arm, the cam follower 61 may be turned to the position where its registering mark 65 is aligned with the cooperating register mark 66 of the range finder collar 51, whereupon the cam collar member 61 is clamped to the focusing collar 13 by the screw studs 63.

Figure 4:
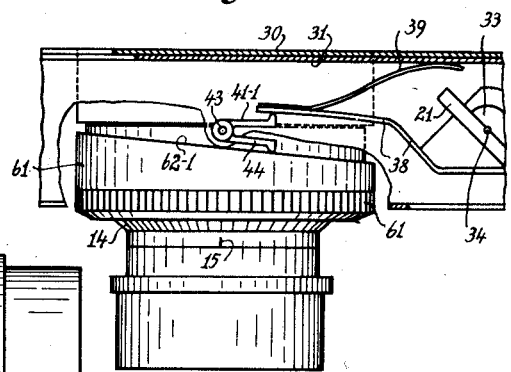
Fig. 4 is a view similar to Fig. 1 of a modified form of range finder.

Alternatively, as shown in Fig. 4, the deflecting mirror arm 38 may be provided with a rearwardly facing cam surface engaged by the follower pin 41—1, pivotally carried by a pivot pin 43 operated by a control arm 44 which is engaged by a cam surface 62—1 of the lens focusing collar 13 so that rotation of the lens focusing collar 13 and its cam surface 62—1 tilts the mirror in the same manner as in the arrangement shown in Figs. 1 to 3, so that the direct and reflected images of the range finder are brought into registration in strict accordance with the distance for which the camera is focused.

Such arrangement makes it possible to operate the control arm 44 of the range finder by the inwardly facing cam surface 62—1 formed on the focusing collar 13.

In order to make it possible to use the same range finder for different lenses having different focal lengths, for instance, the follower member 41 may be adjustably mounted on the arm 42 in the way shown in Figs. 1 and 3 so that by moving the follower by means of an adjusting pin 68 projecting through a slot in the housing 30 along a scale formed on its exterior surface giving the designations of the different lenses, the follower 41 may be moved and adjusted to different predetermined positions so as to compensate for different lenses.

As shown in Fig. 2, the glass plate 26 bordering the inner side of the optical passage formed in the range finder housing may be provided with a rectangular mark 71 so as to serve as a view finder.

In the form of the range finder shown in Figs. 1 to 3, the deflecting mirror 22 located in the path of the main beam A has its mirror surface formed on the front side so that rays of the beam B are reflected from the front surface of the mirror, thereby eliminating double image effects resulting from the use of a rear face mirror which reflects part of the rays from its front face and a part of the rays from its rear face.

The deflecting mirror 22 which is used for aligning the deflected beam B with the direct beam A of the range finder occupies only a small part of the field of vision of the optical passage for the direct A beam. This arrangement gives a very clear image of the object and proper adjustment of the range finder is made possible even if the observed scene is dark and poorly illuminated. In the arrangement shown, the deflecting mirror 22 is made so as to cover only a small central area of the field of vision of the light passage through which the direct beam A reaches the eye, and the mirror 22 is held in its proper position by a post 73 extending in a direction parallel to the axis of the main beam A and confined behind the mirror surface so as not to intercept any rays of the main beam passing along the border edges of the small deflecting mirror surface 22. The mirror post 73 is suitably secured, as by a screw 74, to the central portion of the transparent front glass element 25 of the direct beam light passage.

Various other modifications of the invention will suggest themselves to those skilled in the art.

What is claimed is:

1. In a camera, a lens structure detachably mounted in a predetermined operative position on a wall of said camera, said lens structure including a substantially rigid lens support member and a relatively movable focusing member for focusing the lens structure, a base-type range finder having a supporting structure and adjustable light-deviating means mounted on said supporting structure and including a relatively movable light deviating element for bringing into coincidence a direct image and a deflected image of the field of vision, said range finder supporting structure including a substantially rigid downwardly extending collar extension adapted to be slidably fitted upon and supported by said lens support member and a lateral extension arranged and positioned to abut against the camera wall and a shoulder of the lens support member when the lens support member is mounted in its operative position on said camera wall so as to lock said range finder in its operative position on said camera independently of a movement of said focusing member and to release said range finder from said camera upon removal of said lens structure from said camera, stationary aligning means on the front wall of the camera positioned adjacent to said collar for aligning the range finder in its operative position and a motion-transmitting coupling connection between said focusing member and said light deviating means arranged so that the images of the range finder are automatically brought into coincidence in accordance with the distance for which the camera is focused, said motion transmitting coupling connection being shaped and arranged for establishing operative coupling connections with lens structures of different focal lengths arranged for interchangeable detachable mounting on said camera.

2. In a camera, a lens structure detachably mounted in a predetermined operative position on said camera, said lens structure including a substantially rigid lens support member and a relatively movable focusing member for focusing the lens structure, a range finder having a supporting structure and adjustable light-deviating means mounted on said supporting structure for adjusting the relative position of a direct image and a deflected image of the field of vision, said supporting structure including a substantially rigid downwardly extending extension collar adapted to be slidably fitted upon and supported by said lens support member and a lateral extension arranged and positioned to abut against the camera wall and a shoulder of the lens support member when the latter is mounted in its operative position on said camera wall so as to lock said range finder in its operative position on said camera independently of a movement of said focusing member and to release said range finder from said camera upon removal of said lens structure from said camera, stationary aligning means on the front wall of the camera positioned adjacent to said collar for aligning the range finder in its operative position and a motion-transmitting coupling connection between said focusing member and said light deviating means arranged so that the images of the range finder are brought into a predetermined relative position in accordance with the distance for which the camera is focused.

EDWARD F. WALLENDORF.

REFERENCES CITED

The following references are of record in the file of this patent:

UNITED STATES PATENTS

| Number | Name | Date |
|---|---|---|
| 1,154,966 | Brown | Sept. 28, 1915 |
| 1,675,555 | Howell | July 3, 1928 |
| 1,973,213 | Kuppenbender | Sept. 11, 1934 |
| 2,229,855 | Liebmann | Jan. 28, 1941 |
| 2,413,017 | Willcox | Dec. 24, 1946 |

FOREIGN PATENTS

| Number | Country | Date |
|---|---|---|
| 390,071 | Great Britain | Mar. 30, 1933 |
| 583,230 | Germany | Aug. 30, 1933 |
| 407,888 | Great Britain | Mar. 29, 1934 |